United States Patent Office 3,272,798
Patented Sept. 13, 1966

3,272,798
16α:17α-DERIVATIVES OF 6α-METHYL STEROIDS
Bernard Ellis and Vladimir Petrow, London, England, assignors to The British Drug Houses Limited, London, England, a company of Great Britain
No Drawing. Filed Jan. 20, 1960, Ser. No. 3,498
Claims priority, application Great Britain, Jan. 23, 1959, 2,630/59
16 Claims. (Cl. 260—239.55)

This invention is for improvements in or relating to organic compounds and has particular reference to new 6-methyl steroids of the pregnane series.

It is an object of the present invention to provide new cyclic acetals and ketals of the 6α-methylpregnane series which are represented by Formula I below which are of value on account of their biological activity, and in particular on account of their marked progestational activity when administered by the oral route, which property renders them valuable in, for example, veterinary practice.

According to the present invention there is provided a process for the prevention of a 6α-methyl steroids of the pregnane series having the general formula

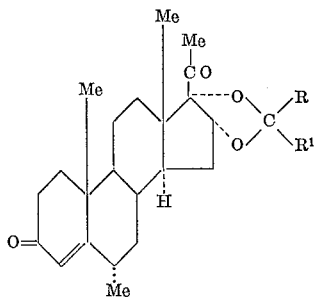

where R is hydrogen or an alkyl or aryl group and R' is an alkyl or aryl group or where R and R' together form a ring, which process comprises oxidizing 6α-methylpregna-4:6-diene-3:20-dione having the formula

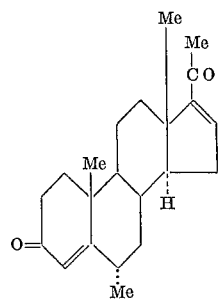

to form 16α:17α - dihydroxy-6α-methylpregn-4-ene-3:20-dione having the formula

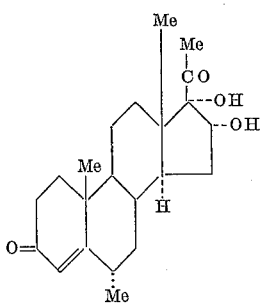

and condensing 16α:17α-dihydroxy-6α-methylpregn-4-ene-3:20-dione with an aldehyde or ketone of the formula R.R'.C=O where R and R' have the same meaning as above.

Oxidation of 6α-methylpregna-4:16-diene-3:20-dione (II) into the 16α:17α-dihydroxy-6α-methylpregn-4-ene-3:20-dione (III) may be achieved with potassium permanganate, for example, in aqueous acetone solution rendered slightly acid with acetic acid and within the temperature range 0° to 25° C. The reaction proceeds rapidly under these conditions, with separation of brown manganese oxides, which are conveniently dissolved at the end of the reaction by treating the mixture with sulphur dioxide. Thereafter the product (III) may be isolated by, for example, extraction with an organic solvent in which it is soluble and which is immiscible with water, such as ether.

Condensation of the 16α:17α-dihydroxy-6α-methylpregn-4-ene (III) with aldehydes or ketones to give the cyclic acetals or ketals (I) may be effected by methods established by prior art and in particular by condensation in the presence of an acidic catalyst. Perchloric acid is the preferred catalyst. The condensation may be performed at room temperature employing a large excess of the aldehyde or ketone which acts as solvent or alternatively in the presence of an inert organic solvent such as benzene.

The invention provides the following new compounds: 16α:17α-dihydroxy-6α-methylpregn-4-ene - 3:20 - dione (III), which is of value as an intermediate in the preparation of cyclic acetals and ketals having the general Formula I. 6α - methyl - 16α:17α-(2':2'-dimethyl-4':5'-dioxolane)-pregesterone (I; R=R'=Me), which is of valuable in particular on account of its progestational property when administered by the oral route, such progestational property being associated with a diuretic response that may be demonstrated in saline loaded rats. The material is thus of value in the treatment of those conditions in which a diuretic effect is advantageously superimposed upon a progestational effect.

6α-methyl-16α:17α-(2'-methyl-2'-ethyl-4':5'-dioxolane)-progesterone.
6α-methyl-16α:17α-(2'-methyl-2'-n-propyl-4':5'-dioxolane)-progesterone.
6α-methyl-16α:17α-(2':2'-diethyl-4':5'-dioxolane)-progesterone.
6α - methyl - 16α:17α-(2'-methyl-2'-n-butyl-4':5'-dioxolane)-progesterone.
6α-methyl-16α:17α-(2':2'-di-n-propyl-4':5'-dioxolane)-progesterone.
6α - methyl-16α:17α-(2'-methyl-2'-isobutyl-4':5'-dioxolane)-progesterone.
6α-methyl-16α:17α-(2':2'-spiro-cyclo-pentyl-4':5'-dioxolane)-progesterone.
6α - methyl - 16α:17α-(2':2'-spiro-cyclohexyl-4':5-dioxolane)-progesterone.
6α-methyl-16α:17α-(2':2'-spiro-(4"-cyclo-methylhexyl)-4':5'-dioxolane)-progesterone.
6α-methyl-16α:17α-(2'-phenyl-4':5'-dioxolane)progesterone.
6α - methyl-16α:17α-(2'-tolyl-4':5'-dioxolane)progesterone.
6α - methyl - 16α:17α-(2'-methyl-2'-phenyl-4':5'-dioxolane)-progesterone.
6α - methyl - 16α:17α-(2'-methyl-4':5'-dioxolane)progesterone (I; R=H, R'=Me) which is a value on account its progestational properties, and diuretic properties which may be demonstrated in saline loaded rats.

Following is a description by way of example of methods of carrying the invention into effect:

*Example 1*

A solution of potassium permanganate (3 g.) in a mixture of acetone (130 ml.) and water (25 ml.) was added during 20 minutes to a stirred solution of 6α-methylpregna-4:16-diene-3:20-dione (5.2 g.) in a mixture of acetone (160 ml.) and acetic acid (1.4 ml.). After treatment with sulphur dioxide, the pale yellow solution was decanted from inorganic salts, diluted with water, and the product extracted with ether. The extract was washed with aqueous sodium bicarbonate, water, and then dried. Concentration to 30 ml. gave crystals which were purified from aqueous ethanol. 16α:17α-dihydroxy-6α-methyl-pregn-4-ene-3:20-dione separated in needles, M.P. 223° to 225° C. $[\alpha]_D^{21}+82°$ (c., 0.94 in chloroform), $\lambda_{max.}$ 240 m$\mu$ (log $\epsilon$, 4.19).

A suspension of the foregoing compound (200 mg.) in acetone (15 ml.) was treated with 1 drop of perchloric acid (72%). After 30 minutes, the mixture was poured into water and the product collected and purified from aqueous ethanol. 6α-methyl-16α:17α-(2':2'-dimethyl-4':5'-dioxolane)progesterone formed needles, M.P. 167° C., $[\alpha]_D^{23}+113°$ (c., 0.25 in chloroform), $\lambda_{max.}$ 240 m$\mu$ (log. $\epsilon$, 4.17).

*Example 2*

A suspension of 16α:17α-dihydroxy-6α-methylpregn-4-ene-3:20-dione (300 mg.) (prepared as described in Example 1) in methylethyl ketone (20 ml.) was treated with 2 drops of perchloric acid (72%). After 3 hours, ether (60 ml.) was added, the mixture washed with water, dried, and the solvents removed. The residue was purified from aqueous ethanol to give blades of the cyclic ketal represented by Formula I (where R=CH$_3$; R'=C$_2$H$_5$), i.e. 6α - methyl-16α:17α-(2'-methyl-2'-ethyl-4':5'-dioxolane)progesterone, M.P. 178 to 179° C., $[\alpha]_D^{23}$ +108° (c., 0.41 in chloroform).

*Example 3*

A suspension of 16α:17α-dihydroxy-6α-methylpregn-4-ene-3:20-dione (300 mg.) (prepared as described in Example 1) in methyl n-propyl ketone (20 ml.) was treated with 2 drops of perchloric acid (72%). Ether (50 ml.) was added after 2 hours, the mixture was washed, dried, and the solvents removed in vacuo. Crystallization of the residue from acetone/hexane gave the cyclic ketal represented by Formula I (where R=Me; R'=n-C$_3$H$_7$), i.e. 6α - methyl - 16α:17α-(2'-methyl-2'-n-propyl-4':5'-dioxolane)progesterone.

*Example 4*

A suspension of 16α:17α-dihydroxy-6α-methylpregn-4-ene-3:20-dione (200 mg.) (prepared as described in Example 1) in diethyl ketone (20 ml.) was treated with 2 drops of perchloric acid (72%). After 1 hour the mixture was treated with ether (50 ml.), and the product isolated as described in Example 3. It was purified from aqueous methanol to give the cyclic ketal represented by Formula I (where R=R'=C$_2$H$_5$), i.e. 6α-methyl-16α:17α-(2':2'-diethyl-4':5'-dioxolane)progesterone.

*Example 5*

A suspension of 16α:17α-dihydroxy-6α-methylpregn-4-ene-3:20-dione (400 mg.) (prepared as described in Example 1) in hexan-2-one (20 ml.) was treated with 2 drops of perchloric acid (72%). After 3 hours, ether (60 ml.) was added, the mixture was washed with water, dried, and the solvents removed in vacuo. The residue was purified from acetone/hexane to give the cyclic ketal represented by Formula I (where R=CH$_3$; R'=n-C$_4$H$_9$), i.e. 6α - methyl-16α:17α-(2'-methyl-2'-n-butyl-4':5'-dioxolane)progesterone.

*Example 6*

A suspension of 16α:17α-dihydroxy-6α-methylpregn-4-ene-3:20-dione (200 mg.) (prepared as described in Example 1) in di-n-propyl ketone (15 ml.) was treated with 1 drop of perchloric acid (72%). After standing overnight, the mixture was diluted with ether (60 ml.), washed neutral, dried, and the solvents removed in vacuo. Crys-tallization of the product from aqueous ethanol gave the cyclic ketal represented by Formula I (where

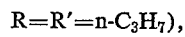

i.e. 6α - methyl - 16α:17α-(2':2'-di-n-propyl-4':5'-dioxolane)progesterone.

*Example 7*

A suspension of 16α:17α-dihydroxy-6α-methylpregn-4-ene-3:20-dione (350 mg.) (prepared as described in Example 1) in methyl isobutyl ketone (20 ml.) was treated with 2 drops of perchloric acid (72%). After a reaction period of 4 hours, the product was isolated as described in Example 3, and purified from aqueous ethanol. There was obtained the cyclic ketal represented by Formula I (where R=CH$_3$; R'=iso-C$_4$H$_9$), i.e. 6α-methyl-16α:17α-(2'-methyl-2'-isobutyl-4':5'-dioxolone)progesterone.

*Example 8*

A suspension of 16α:17α-dihydroxy-6α-methylpregn-4-ene-3:20-dione (350 mg.) (prepared as described in Example 1 in cyclopentanone (15 ml.) was treated with 2 drops of perchloric acid (72%). After standing for 2 hours, ether (60 ml.) was added, the mixture washed, dried and the solvents removed in vacuo. Crystallization of the product from acetone/hexane gave the cyclic ketal represented by Formula I (where

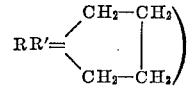

i.e. 6α - methyl-16α:17α-(2':2'-spiro-cyclo-pentyl-4':5'-dioxolane)progesterone.

*Example 9*

A suspension of 16α:17α-dihydroxy-6α-methylpregn-4-ene-3:20-dione (400 mg.) (prepared as described in Example 1) in cyclohexanone (10 ml.) was treated with 2 drops of perchloric acid (72%). After 3 hours, the mixture was steam-distilled to remove solvent, and the product isolated with ether. It crystallized from acetone/hexane to give the cyclic ketal represented by Formula I (where

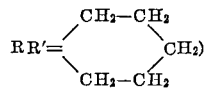

i.e. 6α - methyl-16α:17α-(2':2'-spiro-cyclohexyl-4':5'-dioxolane)progesterone.

*Example 10*

A suspension of 16α:17α-dihydroxy-6α-methylpregn-4-ene-3:20-dione (350 mg.) (prepared as described in Example 1) in 4-methylcyclohexanone (15 ml.) was treated with 2 drops of perchloric acid (72%). After 4 hours, the mixture was steam-distilled and the product isolated with ether. Crystallization gave the cyclic ketal represented by Formula I (where

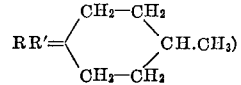

i.e. 6α-methyl-16α:17α-(2':2'-spiro-(4"-cyclo-methylhex-yl)-4':5'-dioxolane)progesterone.

*Example 11*

A solution of 16α:17α-dihydroxy-6α-methylpregn-4-ene-3:20-dione (400 mg.) (prepared as described in Example 1) in benzaldehyde (5 ml.) was treated with 1 drop of perchloric acid (72%). After 3 hours, the mixture was submitted to steam-distillation, and the product isolated with ether. Crystallization from aqueous ethanol gave the cyclic ketal represented by Formula I (where R=H; R'=C$_6$H$_5$), plates, M.P. 205° to 207° C., i.e. 6α-methyl-16α:17α-(2'-phenyl-4':5'-dioxolane)progesterone, $[\alpha]_D^{21}$ +90° (c., 0.84 in chloroform).

Example 12

A solution of 16α:17α-dihydroxy-6α-methylpregn-4-ene-3:20-dione (400 mg.) (prepared as described in Example 1) in p-tolylaldehyde (10 ml.) was treated with 1 drop of perchloric acid (72%). After 3 hours, the mixture was steam-distilled, and the product isolated with ether. Purification from acetone/hexane gave the cyclic acetal represented by Formula I (where R=H; R'=C₆H₄.CH₃), i.e. 6α - methyl-16α:17α-(2'-tolyl-4':5'-dioxolane)progesterone.

Example 13

A solution of 16α:17α-dihydroxy-6α-methylpregn-4-ene-3:20-dione (400 mg.) (prepared as described in Example 1) in methyl phenyl ketone (5 ml.) was treated with 1 drop of perchloric acid (72%). After 5 hours, the mixture was steam-distilled and the product isolated with ether. Purification from aqueous methanol gave the cyclic ketal represented by Formula I (where R=CH₃; R'=C₆H₅), i.e. 6α-methyl-16α:17α-(2'-methyl-2'-phenyl-4':5'-dioxolane)progesterone.

Example 14

A suspension of 16α:17α-dihydroxy-6α-methylpregn-4-ene 3:20-dione (500 mg.) in paraldehyde (1 ml.) was treated with 2 drops of perchloric acid (72%). After 2 hours, ether (50 ml.) was added and the solution washed with aqueous sodium hydrogen carbonate, water, and dried. Removal of the solvents gave a gum which was chromatographed on alumina (15 g.). Elution with benzene-light petroleum (3:2) gave a solid which was purified from aqueous methanol. 6α-methyl-16α:17α-(2'-methyl-4':5'-dioxolane)progesterone crystallized in flakes, M.P. 172 to 174° C., $[\alpha]_D^{26}$ +123° (c., 0.8 in chloroform). This compound is represented by Formula I where R=H; R'=Me.

We claim:
1. 6α-methyl steroids of the pregnane series having the general formula

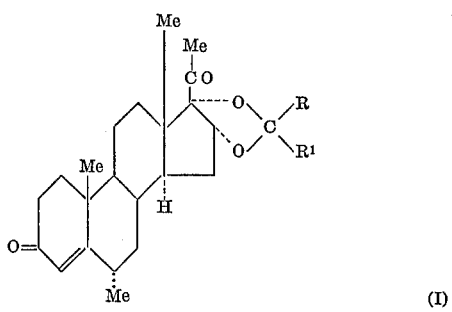

where

are selected from the group consisting of

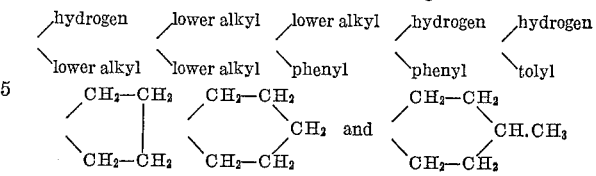

2. 16α:17α - dihydroxy - 6α - methylpregn-4-ene-3:20-dione.
3. 6α - methyl - 16α:17α - (2':2'-dimethyl-4':5'-dioxolane)-progesterone.
4. 6α-methyl-16α:17α-(2'-methyl-2'-ethyl - 4':5'-dioxolane)-progesterone.
5. 6α - methyl-16α:17α-(2'-methyl-2'-n-propyl - 4':5'-dioxolane)-progesterone.
6. 6α - methyl - 16α:17α - (2':2'-diethyl-4':5'-dioxolane)-progesterone.
7. 6α - methyl - 16α:17α-(2'-methyl-2'-n-butyl-4':5'-dioxolane)-progesterone.
8. 6α-methyl - 16α:17α - (2':2'-di-n-propyl-4'-5'-dioxolane)-progesterone.
9. 6α - methyl - 16α:17α-(2'-methyl-2'-isobutyl-4':5'-dioxolane)-progesterone.
10. 6α - methyl - 16α:17α - (2':2'-spiro-cyclo-pentyl-4':5'-dioxolane)-progesterone.
11. 6α - methyl-16α:17α-(2':2'-spiro-cyclohexyl-4':5'-dioxolane)-progesterone.
12. 6α - methyl-16α:17α-(2':2'-spiro-(4''-cyclo-methyl-hexyl)-4':5'-dioxolane)-progesterone.
13. 6α - methyl - 16α:17α-(2'-phenyl-4':5'-dioxolane)-progesterone.
14. 6α - methyl - 16α:17α - (2'-tolyl-4':5'-dioxolane)-progesterone.
15. 6α - methyl - 16α:17α - (2'-methyl-2'-phenyl-4':5'-dioxolane)-progesterone.
16. 6α - methyl - 16α:17α-(2'-methyl-4':5'-dioxolane)-progesterone.

References Cited by the Examiner

UNITED STATES PATENTS 2,727,909  12/1955  Colton _____ 260—397.4
2,864,838  12/1958  Lincoln et al. _____ 260—397.45

OTHER REFERENCES

Burn et al.: J. Chem. Soc., London (September 1957), pp. 4092–4098.
Cooley et al.: J. Chem. Soc., London (December 1955), pp. 4373–4377.
Fried et al.: J. Am. Chem. Soc., vol. 80 (May 5, 1958), pages 2338 and 2339.

LEWIS GOTTS, *Primary Examiner.*

LESLIE H. GASTON, MAYER LIEBMAN,
*Examiners.*

T. J. MORGAN, M. L. WILLIAMS,
*Assistant Examiners.*